US010526956B2

(12) United States Patent
Isono et al.

(10) Patent No.: US 10,526,956 B2
(45) Date of Patent: Jan. 7, 2020

(54) TURBOCHARGER

(71) Applicant: IHI Corporation, Koto-ku (JP)

(72) Inventors: Yuusuke Isono, Tokyo (JP); Kiyomichi Ichikawa, Tokyo (JP); Atsushi Mori, Tokyo (JP); Yuji Kobayashi, Tokyo (JP); Kazuaki Iwata, Tokyo (JP)

(73) Assignee: IHI Corporation, Koto-ku (JP)

( * ) Notice: Subject to any disclaimer, the term of this patent is extended or adjusted under 35 U.S.C. 154(b) by 469 days.

(21) Appl. No.: 15/362,313

(22) Filed: Nov. 28, 2016

(65) Prior Publication Data
US 2017/0074114 A1 Mar. 16, 2017

Related U.S. Application Data

(63) Continuation of application No. PCT/JP2015/066007, filed on Jun. 3, 2015.

(30) Foreign Application Priority Data

Jun. 11, 2014 (JP) .................................. 2014-120948

(51) Int. Cl.
F02B 37/18 (2006.01)
F04D 27/02 (2006.01)
F01D 17/14 (2006.01)
F01D 17/10 (2006.01)
(Continued)

(52) U.S. Cl.
CPC ............ F02B 37/18 (2013.01); F01D 17/105 (2013.01); F01D 17/148 (2013.01); F01D 25/04 (2013.01);
(Continued)

(58) Field of Classification Search
CPC .. F05D 2220/40; F05D 2260/96; F02B 37/18; F02B 37/00; F16K 1/22;
(Continued)

(56) References Cited

U.S. PATENT DOCUMENTS 4,074,889 A * 2/1978 Engel .................... F16K 1/2028
251/298
4,120,156 A * 10/1978 McInerney ........... F02B 37/183
415/144
(Continued)

FOREIGN PATENT DOCUMENTS

JP 7-25248 U 5/1995
JP 8-334030 12/1996
(Continued)

OTHER PUBLICATIONS

Office Action dated Nov. 7, 2017 in Japanese Patent Application No. 2016-527760.
(Continued)

Primary Examiner — Charles G Freay
(74) Attorney, Agent, or Firm — Oblon, McClelland, Maier & Neustadt, L.L.P.

(57) ABSTRACT

A turbocharger includes: a bearing portion which is provided in a turbine housing; a shaft rotatably inserted into a bearing hole of the bearing portion; an attaching member fixed to the shaft; and a valve coupled to the shaft via the attaching member and configured to open and close a flow path opened to an internal space along with rotation of the shaft. The attaching member includes: a base portion provided with an insertion hole of the shaft; and an extension portion integrally formed with the base portion and extending from the base portion in a radial direction of the shaft to thereby hold the valve. The base portion is provided at least at a part of a range of the shaft in a circumferential direction of the shaft, and protrudes more in the radial direction of the shaft than the bearing portion.

10 Claims, 5 Drawing Sheets

(51) Int. Cl.
   *F02C 6/12*      (2006.01)
   *F01D 25/04*     (2006.01)
   *F02B 37/00*     (2006.01)

(52) U.S. Cl.
   CPC ............ *F02C 6/12* (2013.01); *F04D 27/0215* (2013.01); *F02B 37/00* (2013.01); *F05D 2220/40* (2013.01); *F05D 2240/35* (2013.01); *F05D 2260/96* (2013.01); *Y02T 10/144* (2013.01)

(58) Field of Classification Search
   CPC . F16K 1/221; F16K 1/224; F16K 1/20; F16K 1/2007; F16K 1/2028; F02C 6/12; Y02T 10/144; F01D 25/04; F01D 25/17; F01D 25/105; F01D 25/148; F04D 27/0215
   See application file for complete search history.

(56)           References Cited

U.S. PATENT DOCUMENTS

| | | | | |
|---|---|---|---|---|
| 4,519,579 | A * | 5/1985 | Brestel | F16K 1/2263 251/172 |
| 4,730,456 | A * | 3/1988 | Tadokoro | F01D 17/18 251/298 |
| 6,024,125 | A * | 2/2000 | Baumann | F16K 1/24 137/625.32 |
| 9,574,456 | B2 * | 2/2017 | Murayama | F02B 37/183 |
| 2012/0228833 | A1 | 9/2012 | Delitz | |
| 2014/0321986 | A1 | 10/2014 | Takahashi et al. | |

FOREIGN PATENT DOCUMENTS

| | | |
|---|---|---|
| JP | 2013-15102 | 1/2013 |
| JP | 2013-15103 | 1/2013 |
| JP | 2013-512373 | 4/2013 |
| WO | WO 2013/115206 A1 | 8/2013 |
| WO | WO 2014/011468 A1 | 1/2014 |

OTHER PUBLICATIONS

International Search Report dated Sep. 8, 2015 in PCT/JP2015/066007, filed on Jun. 3, 2015 (with English Translation).

Written Opinion dated Sep. 8, 2015 in PCT/JP2015/066007, filed on Jun. 3, 2015.

\* cited by examiner

TURBOCHARGER

CROSS REFERENCE TO RELATED APPLICATIONS

This application is a continuation application of International Application No. PCT/JP2015/066007, filed on Jun. 3, 2015, which claims priority to Japanese Patent Application No. 2014-120948, filed on Jun. 11, 2014, the entire contents of which are incorporated by reference herein.

BACKGROUND

1. Technical Field

The present disclosure relates to a turbocharger including a valve that opens and closes a flow path which is opened to an internal space of a housing.

2. Description of the Related Art

Conventionally, there is known a turbocharger in which a rotation shaft where a turbine wheel is provided at one end and a compressor wheel is provided at the other end is rotatably held in a bearing housing. Such a turbocharger is connected to an engine, the turbine wheel is rotated by an exhaust gas discharged from the engine and the compressor wheel is rotated by the rotation of the turbine wheel via the rotation shaft. In this way, along with the rotation of compressor wheel, the turbocharger compresses air and feeds it out to the engine.

The turbocharger disclosed in Japanese Patent Laid-Open Publication (Translation of PCT Application) No. 2013-512373 (Patent Literature 1) includes a bypass flow path. The bypass flow path passes apart of an exhaust gas from a turbine housing to the downstream side of a turbine wheel not via a turbine scroll flow path communicating with the turbine wheel. Namely, the part of the exhaust gas passes through the bypass flow path to thereby bypass the turbine scroll flow path and the turbine wheel. The bypass flow path is opened and closed by a valve. The valve is provided within the turbine housing and is coupled to a shaft. The shaft is rotatably supported by a bearing portion provided in the turbine housing. The bearing portion is placed in the turbine housing so as to penetrate through the inside and outside of the turbine housing. As described above, when the shaft is rotated by the power of an actuator, the valve is operated together with the shaft, and thus the bypass flow path is opened and closed by the operation of the valve.

SUMMARY

When as described above, the bearing portion is provided in the housing of the turbocharger, and the shaft is rotatably supported in the bearing portion, the shaft is vibrated in the axial direction thereof, due to the influence of exhaust pulsation or the like, with the result that a noise may be produced.

An object of the present disclosure is to provide a turbocharger which can suppress the vibration of a shaft and the like that operate a valve and an abnormal noise caused by the vibration.

A first aspect of the present disclosure is a turbocharger including: a housing including an internal space formed therein; a cylindrical bearing portion provided in the housing, the cylindrical bearing portion being provided with a bearing hole penetrating between the internal space of the housing and an outside of the housing; a shaft rotatably supported in the bearing hole, at least one end of the shaft protruding more to an inside of the housing than the bearing portion; an attaching member fixed to a side of the one end of the shaft protruding from the bearing portion; and a valve coupled to the shaft via the attaching member, the valve being configured to open and close a flow path opened to the internal space along with rotation of the shaft, wherein the attaching member includes: a base portion in which an insertion hole through which the shaft is inserted is formed; and an extension portion which is formed integrally with the base portion and which extends from the base portion in a radial direction of the shaft to thereby hold the valve, and the base portion is provided at least at a part of a range of the shaft in a circumferential direction of the shaft, and protrudes more in the radial direction of the shaft than the bearing portion.

Any one or both of the base portion and the extension portion may protrude more in an axial direction of the shaft than the valve.

A second aspect of the present disclosure is a turbocharger including: a housing including an internal space is formed therein; a cylindrical bearing portion provided in the housing, the cylindrical bearing portion being provided with a bearing hole penetrating between the internal space of the housing and an outside of the housing; a shaft which is rotatably supported in the bearing hole at least one end of the shaft protruding more to an inside of the housing than the bearing portion; an attaching member fixed to a side of the one end of the shaft protruding from the bearing portion; and a valve coupled to the shaft via the attaching member, the valve being configured to open and close a flow path opened to the internal space along with rotation of the shaft, wherein the attaching member includes: a base portion in which an insertion hole through which the shaft is inserted is formed; and an extension portion which is integrally formed with the base portion and which extends from the base portion in a radial direction of the shaft to thereby hold the valve, and any one or both of the base portion and the extension portion protrude more in an axial direction of the shaft than the valve.

In any one or both of the base portion and the extension portion, an end portion on a side opposite to a side of the bearing portion in both end portions of the shaft in the axial direction protrudes more in the axial direction of the shaft than the valve.

One end of the shaft may protrude from the insertion hole.

According to the present disclosure, it becomes possible to suppress the vibration of a shaft and the like which operate a valve, and an abnormal noise caused by the vibration.

BRIEF DESCRIPTION OF THE DRAWINGS

FIG. 2A is a view when a discharge port of the turbine housing is seen from the front and FIG. 2B is a side view of the turbine housing.

FIG. 3A is a perspective view of the attaching plate according to the embodiment of the present disclosure, FIG. 3B is a side view of the attaching plate according to the present embodiment, and FIG. 3C is a top view of the attaching plate according to the present embodiment.

FIG. 4A is a perspective view of the attaching plate according to the comparative example, FIG. 4B is a side view of the attaching plate according to the comparative example, and FIG. 4C is a top view of the attaching plate according to the comparative example.

DESCRIPTION OF THE EMBODIMENTS

An embodiment of the present disclosure will be described in detail below with reference to accompanying drawings. Dimensions, materials, specific values and the like indicated in the embodiment are simply examples for facilitating the understanding of the disclosure and do not limit the present disclosure unless otherwise particularly specified. Note that, in the present specification and drawings, the same symbols are attached to elements which have substantially the same functions and configurations, and thus the repeated descriptions thereof are omitted and elements which are not directly related to the present disclosure are not illustrated.

Figure 1:
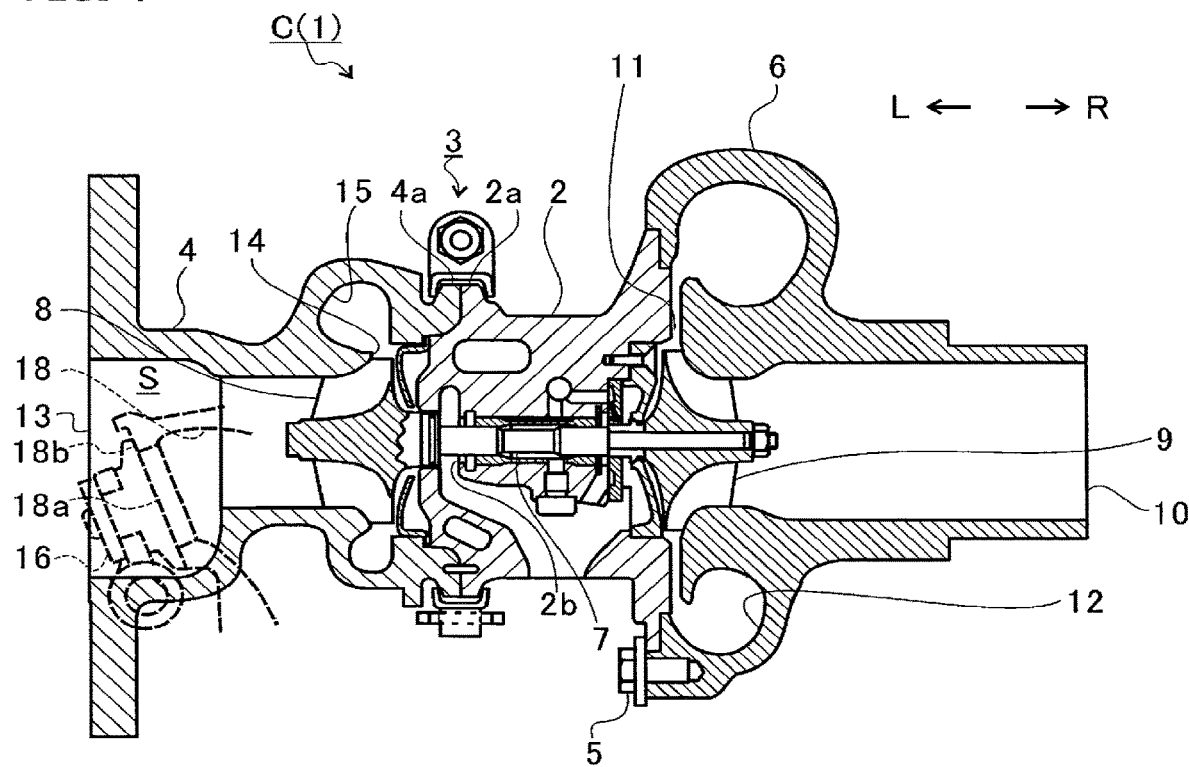
FIG. 1 is a schematic cross-sectional view of a turbocharger according to an embodiment of the present disclosure.

FIG. 1 is a schematic cross-sectional view of a turbocharger C. In the following description, it is assumed that an arrow L shown in FIG. 1 is a direction which indicates the left side of the turbocharger C and that an arrow R is a direction which indicates the right side of the turbocharger C. As shown in FIG. 1, the turbocharger C includes a turbocharger main body 1. The turbocharger main body 1 includes a bearing housing 2, a turbine housing 4 which is coupled to the left side of the bearing housing 2 through the use of a fastening mechanism 3 and a compressor housing 6 which is coupled to the right side of the bearing housing 2 through the use of a fastening bolt 5. They are integrally formed.

A protrusion 2a is provided on the outer circumferential surface of the bearing housing 2 in the vicinity of the turbine housing 4. The protrusion 2a protrudes in the radial direction of the bearing housing 2. Furthermore, a protrusion 4a is provided on the outer circumferential surface of the turbine housing 4 in the vicinity of the bearing housing 2. The protrusion 4a protrudes in the radial direction of the turbine housing 4. The bearing housing 2 and the turbine housing 4 are fixed by band-fastening the protrusions 2a and 4a through the use of the fastening mechanism 3. The fastening mechanism 3 is constituted of a fastening band (for example, G coupling) which sandwiches the protrusions 2a and 4a.

In the bearing housing 2, a through-hole 2b penetrating through the turbocharger C in the left/right direction is formed. In the through-hole 2b, a rotation shaft 7 is rotatably supported. A turbine wheel 8 is integrally fixed to the left end portion of the rotation shaft 7. The turbine wheel 8 is rotatably accommodated within the turbine housing 4. Further, a compressor wheel 9 is integrally fixed to the right end portion of the rotation shaft 7. The compressor wheel 9 is rotatably accommodated within the compressor housing 6.

A suction port 10 is formed in the compressor housing 6. The suction port 10 is open to the right side of the turbocharger C and is connected to an air cleaner (not shown). Furthermore, in a state where the bearing housing 2 and the compressor housing 6 are coupled to each other with the fastening bolt 5, facing surfaces of both the housings 2 and 6 facing each other form a diffuser flow path 11 which compresses air to raise the pressure thereof. The diffuser flow path 11 is formed in the shape of a ring from the inside to the outside of the rotation shaft 7 (the compressor wheel 9) in the radial direction. The diffuser flow path 11 communicates with the suction port 10 via the compressor wheel 9, in the inside in the radial direction.

Moreover, the compressor housing 6 is provided with a compressor scroll flow path 12. The compressor scroll flow path 12 is annularly formed and is located on an outer side of the rotation shaft 7 (the compressor wheel 9) in the radial direction from the diffuser flow path 11. The compressor scroll flow path 12 communicates with a suction port (not shown) of an engine. In addition, the compressor scroll flow path 12 also communicates with the diffuser flow path 11. Therefore, when the compressor wheel 9 is rotated, air is sucked from the suction port 10 into the compressor housing 6, the pressure of the air is raised in the diffuser flow path 11 and the compressor scroll flow path 12, and the resultant air is guided to the suction portion of the engine.

A discharge port 13 is formed in the turbine housing 4. The discharge port 13 is open to the left side of the turbocharger C and is connected to an exhaust gas purification device (not shown) The turbine housing 4 has an internal space S which includes the discharge port 13 as one end. In the internal space S, a valve 16 which will be described later is arranged. Furthermore, the turbine housing 4 is provided with an internal flow path 14 and a turbine scroll flow path 15. The turbine scroll flow path 15 is annularly formed and is located on an outer side of the rotation shaft 7 (the turbine wheel 8) in the radial direction from the internal flow path 14. The turbine scroll flow path 15 communicates with a gas inlet 17 (see FIG. 2B) to which an exhaust gas discharged from the exhaust manifold (not shown) of the engine is guided. In addition, the turbine scroll flow path 15 also communicates with the internal flow path 14. Therefore, the exhaust gas is guided from the gas inlet 17 to the turbine scroll flow path 15 and is guided to the discharge port 13 via the internal flow path 14, the turbine wheel 8 and the internal space S. In this distribution process, the exhaust gas rotates the turbine wheel 8. The rotation force of the turbine wheel 8 is transmitted through the rotation shaft 7 to the compressor wheel 9, and thus the compressor wheel 9 is rotated. The pressure of the air is raised by the rotation force of the compressor wheel 9, and the air is guided to the suction port of the engine.

Figure 2A:
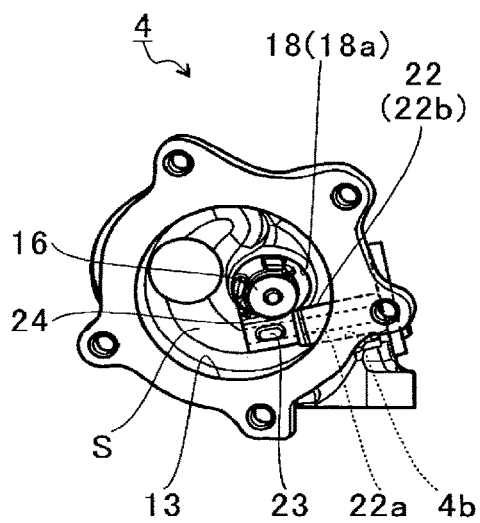
FIGS. 2A and 2B are external views of a turbine housing according to the embodiment of the present disclosure.
Figure 2B:
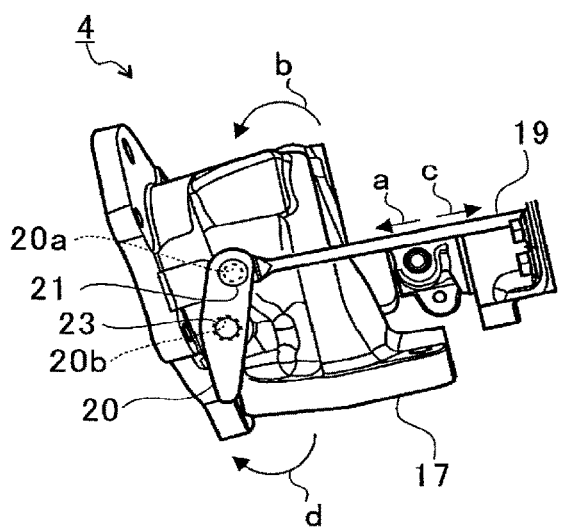

FIGS. 2A and 2B are external views of the turbine housing 4. FIG. 2A is a view when the discharge port 13 of the turbine housing 4 is seen from the front. FIG. 2B is a side view of the turbine housing 4. In FIG. 2B, the gas inlet 17 is open substantially to the lower side of the turbine housing 4. The flow path communicating from the gas inlet 17 to the turbine scroll flow path 15 is branched on the upstream side of the turbine scroll flow path 15. Furthermore, as shown in FIG. 1, the exit end 18a of a bypass flow path 18 (flow path) which is the branched flow path is formed on the wall surface (inner wall) of the turbine housing 4 which forms the internal space S including the discharge port 13.

The exhaust gas flows in from the gas inlet 17, and a part thereof can flow out, through the bypass flow path 18, into the internal space S located downstream of the turbine wheel 8. Namely, the part of the exhaust gas can bypass the turbine wheel 8 and the turbine scroll flow path 15.

The valve 16 is constituted of a valve member whose outside diameter is larger than the inside diameter of the exit end 18a. The valve 16 makes contact with a sheet surface 18b formed around the exit end 18a of the bypass flow path 18 to thereby close the bypass flow path 18, and separates from the sheet surface 18b to thereby open the bypass flow path 18.

An actuator rod 19 shown in FIG. 2B is arranged outside the turbine housing 4. One end of the actuator rod 19 is fixed to an actuator (not shown), and the actuator rod 19 is operated in the axial direction by the power of the actuator. The other end of the actuator rod 19 is fixed to a pin rod 21 (rod) protruding in a direction orthogonal to the axial direction of the actuator rod 19.

A link plate 20 (link member) is constituted of a plate member, and is provided outside the turbine housing 4. A link hole 20a is formed at one end of the link plate 20. The pin rod 21 is rotatably inserted (supported) through the link hole 20a of the link plate 20. Namely, the pin rod 21 is fixed to the actuator rod 19 and is rotatably supported by the link plate 20.

Therefore, when as shown in FIG. 2B, the actuator rod 19 operates in a direction indicated by an arrow a, the link plate 20 is swung in a direction indicated by an arrow b. On the other hand, when the actuator rod 19 operates in a direction indicated by an arrow c, the link plate 20 is swung in a direction of an arrow d.

Furthermore, as shown in FIG. 2A, a housing hole 4b is formed in the turbine housing 4. The housing hole 4b penetrates between the outside (the turbine housing 4 on the side of the actuator rod 19) of the turbine housing 4 and the internal space S of the turbine housing 4. A bearing portion 22 is press-fitted into the housing hole 4b.

The bearing portion 22 is constituted of a cylindrical member. The bearing portion 22 has a bearing hole 22a penetrating from one end to the other end thereof. A shaft 23 is inserted into the bearing hole 22a. Furthermore, the one end of the bearing portion 22 serves as a protrusion portion 22b which protrudes from the inner wall of the turbine housing 4 forming the internal space S. The other end of the bearing portion 22 protrudes to the outside of the turbine housing 4. Namely, the one end of the bearing portion 22 is located in the internal space S, and the other end of the bearing portion 22 is located outside the turbine housing 4.

As described above, the one end of the bearing portion 22 protrudes into the internal space S of the turbine housing 4, and the other end of the bearing portion 22 protrudes to the outside of the turbine housing 4. Namely, the bearing hole 22a of the bearing portion 22 penetrates between the inside (the internal space S) of the turbine housing 4 and the outside of the turbine housing 4.

As described above, the shaft 23 is inserted into the bearing hole 22a of the bearing portion 22, and is rotatably supported in the bearing portion 22. One end of the shaft 23 protrudes more to the side of the internal space S of the turbine housing 4 than the bearing portion 22. Namely, in a state where the one end of the shaft 23 is located in the internal space S, the shaft 23 is rotatably supported in the bearing hole 22a. Furthermore, the other end of the shaft 23 protrudes more to the outside of the turbine housing 4 than the turbine housing 4 and the bearing portion 22. In a state where the other end of the shaft 23 is inserted into a fixing hole 20b of the link plate 20, the other end of the shaft 23 is welded to the link plate 20. Note that, when the link hole 20a is assumed to be provided on the side of one end of the link plate 20, the fixing hole 20b is provided on the side of the other end (in FIG. 2B, substantially on the lower side) of the link plate 20.

An attaching plate 24 serving as an attaching member is constituted of a plate member, and couples the valve 16 and the shaft 23 together. The valve 16 is provided on the side of one end of the attaching plate 24, and the shaft 23 is welded to the side of the other end of the attaching plate 24. A coupling structure of the attaching plate 24 and the valve 16 and a coupling structure of the attaching plate 24 and the shaft 23 will be described in detail later.

The valve 16 is integrally rotated by the attaching plate 24 together with the shaft 23 in the rotation direction of the shaft 23. As a result, when the pin rod 21 is moved by the power of the actuator in a direction (in FIG. 2B, the direction indicated by the arrows a and c) orthogonal to the shaft center of the pin rod 21, as the link plate 20 is operated (in FIG. 2B, the direction indicated by the arrows b and d), the shaft 23 and the valve 16 are rotated together. In this way, the valve 16 opens and closes the exit end 18a of the bypass flow path 18.

Figure 3A:
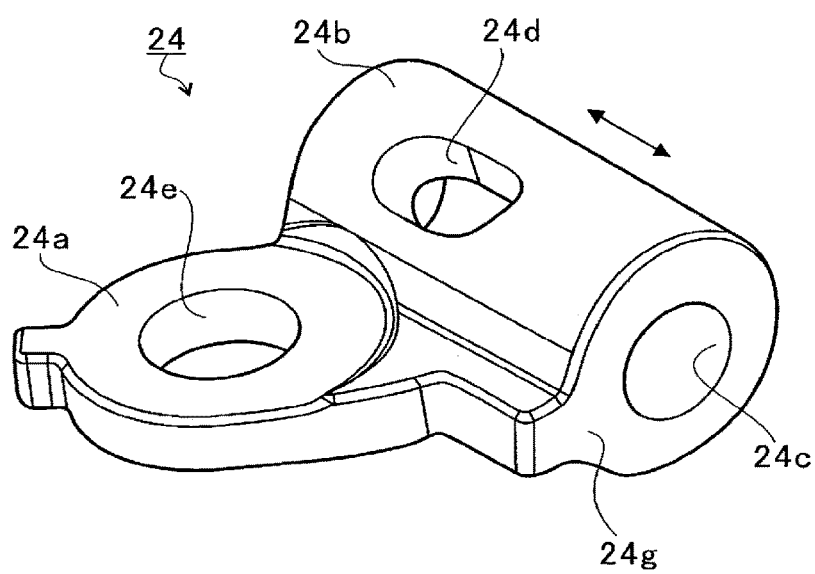
FIGS. 3A to 3C are views for illustrating an attaching plate according to the embodiment of the present disclosure.
Figure 3B:
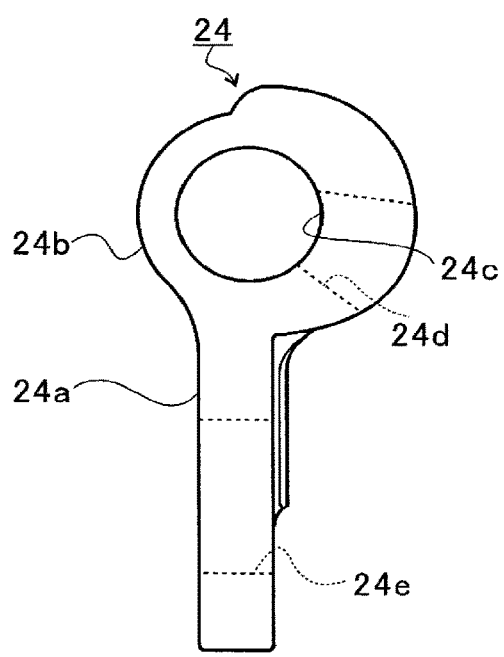
Figure 3C:
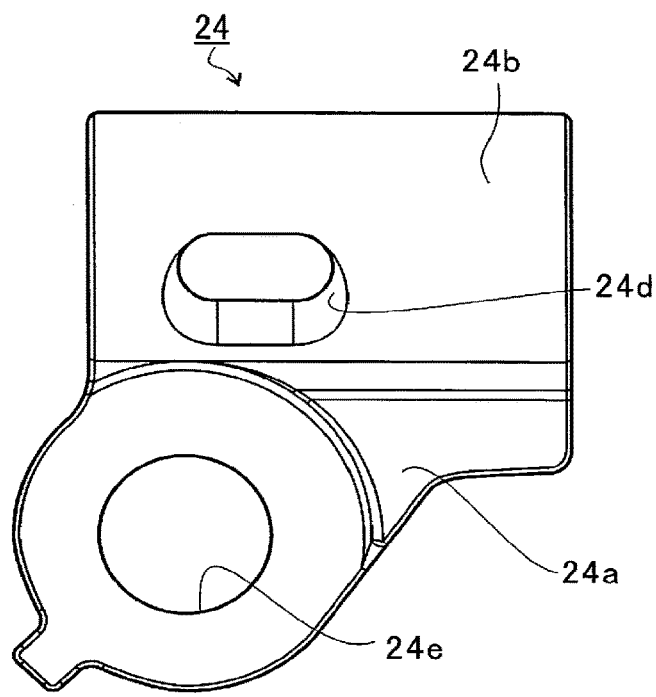

FIGS. 3A to 3C are views for illustrating the attaching plate 24. FIG. 3A is a perspective view of the attaching plate 24. FIG. 3B is a side view of the attaching plate 24. FIG. 3C is a top view of the attaching plate 24.

As shown in FIGS. 3A to 3C, the attaching plate 24 includes a cylindrical base portion 24b. The base portion 24b is provided with an insertion hole 24c, and the shaft 23 is inserted into the insertion hole 24c. An extension portion 24a is a portion which extends from the base portion 24b, in the radial direction of the insertion hole 24c (the shaft 23). The extension portion 24a and the base portion 24b are integrally formed.

An exposure hole 24d is formed in the base portion 24b. The exposure hole 24d extends in the radial direction of the insertion hole 24c, and penetrates the insertion hole 24c from the outside of the base portion 24b. When the shaft 23 is inserted into the insertion hole 24c, a part of the shaft 23 is exposed from the exposure hole 24d.

Furthermore, the extension portion 24a of the attaching plate 24 is provided with a main body hole 24e. The main body hole 24e penetrates the extension portion 24a in the left/right direction of FIG. 3B. The attaching plate 24 and the valve 16 are coupled to each other via the main body hole 24e.

Figure 4A:
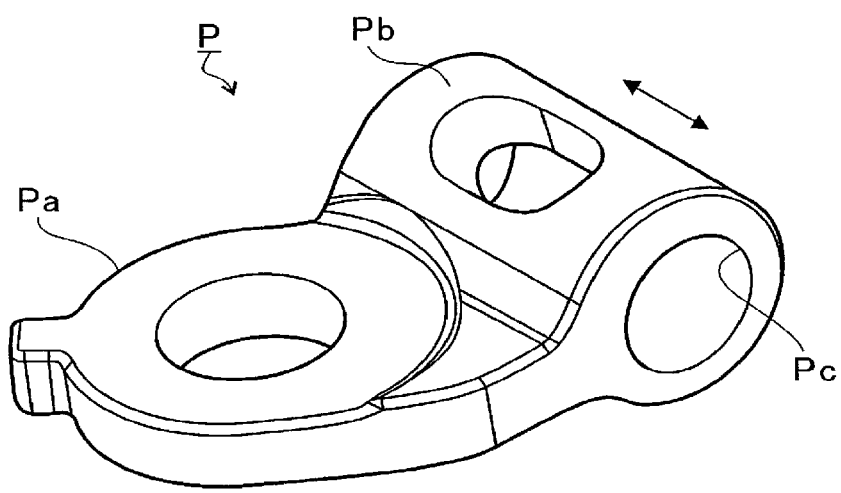
FIGS. 4A to 4C are views for illustrating an attaching plate according to a comparative example.
Figure 4B:
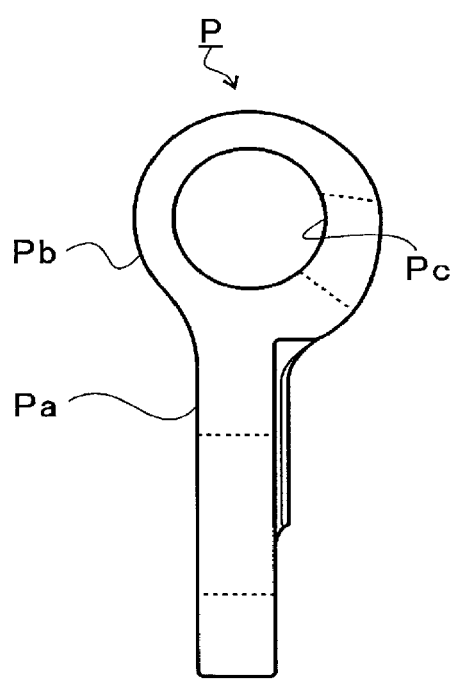
Figure 4C:
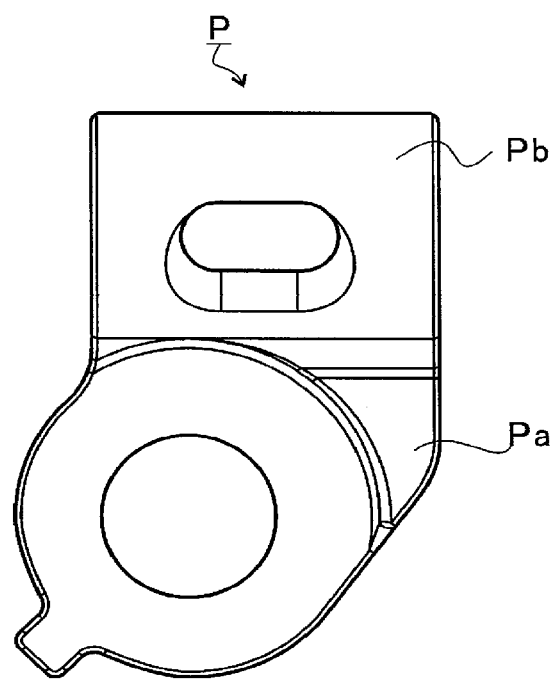

FIGS. 4A to 4C are views for illustrating an attaching plate P according to a comparative example. FIG. 4A is a perspective view of the attaching plate P, FIG. 4B is a side view of the attaching plate P, and FIG. 4C is a top view of the attaching plate P. In FIG. 3A, the direction in which the shaft 23 is inserted into the insertion hole 24c is indicated by a double-headed arrow. Likewise, in FIG. 4A, the direction in which the shaft 23 is inserted into an insertion hole Pc is indicated by a double-headed arrow. As shown in FIGS. 3A to 3C and FIGS. 4A to 4C, the attaching plate P of the comparative example is smaller than the attaching plate 24 of the present embodiment. Specifically, the lengths of parts of the base portion 24b and the extension portion 24a in the direction indicated by the double-headed arrow in FIG. 3A are longer than the lengths of a cylindrical portion Pb and a main body portion Pa of the comparative example in the direction indicated by the double-headed arrow in FIG. 4A.

Furthermore, as is clear from comparison of FIGS. 3B and 4B, the size of the insertion hole 24c in the radial direction in the base portion 24b of the attaching plate 24 is larger than the size of the insertion hole Pc in the radial direction in the cylindrical portion Pb of the attaching plate P. Here, the base portion 24b is formed to be larger substantially toward the right side than the cylindrical portion Pb in FIG. 3B (in FIG. 4B).

Figure 5:
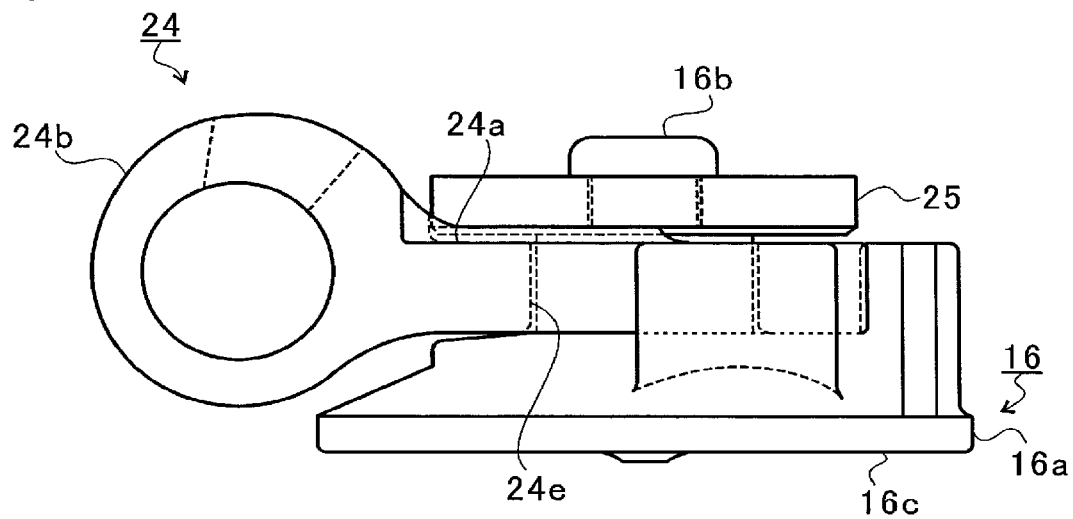
FIG. 5 is a view for illustrating the coupling structure of a valve to the attaching plate.

FIG. 5 is a view for illustrating the coupling structure of the valve 16 to the attaching plate 24, and is a view when the attaching plate 24 is seen from the side surface in a state where the attaching plate 24 and the valve 16 are coupled to each other. As shown in FIG. 5, a protrusion portion 16b is formed on the main body portion 16a of the valve 16. The protrusion portion 16b protrudes from the opposite side of a contact surface 16c making contact with the sheet surface 18b, in a direction orthogonal to the surface direction of the contact surface 16c. Note that the protrusion portion 16b may be formed integrally with the main body portion 16a or the protrusion portion 16b which is a separate member may be fixed to the main body portion 16a by welding or the like.

In a state where the main body portion 24a of the attaching plate 24 is sandwiched between the main body portion 16a of the valve 16 and a washer 25, the protrusion portion 16b of the valve 16 is inserted into the main body hole 24e of the attaching plate 24 and the washer 25. Thereafter, the attaching plate 24 and the valve 16 are coupled to each other by pressurizing, deforming and swaging the tip end of the protrusion portion 16b protruding from the washer 25. In other words, the extension portion 24a of the attaching plate 24 holds the valve 16.

Figure 6:
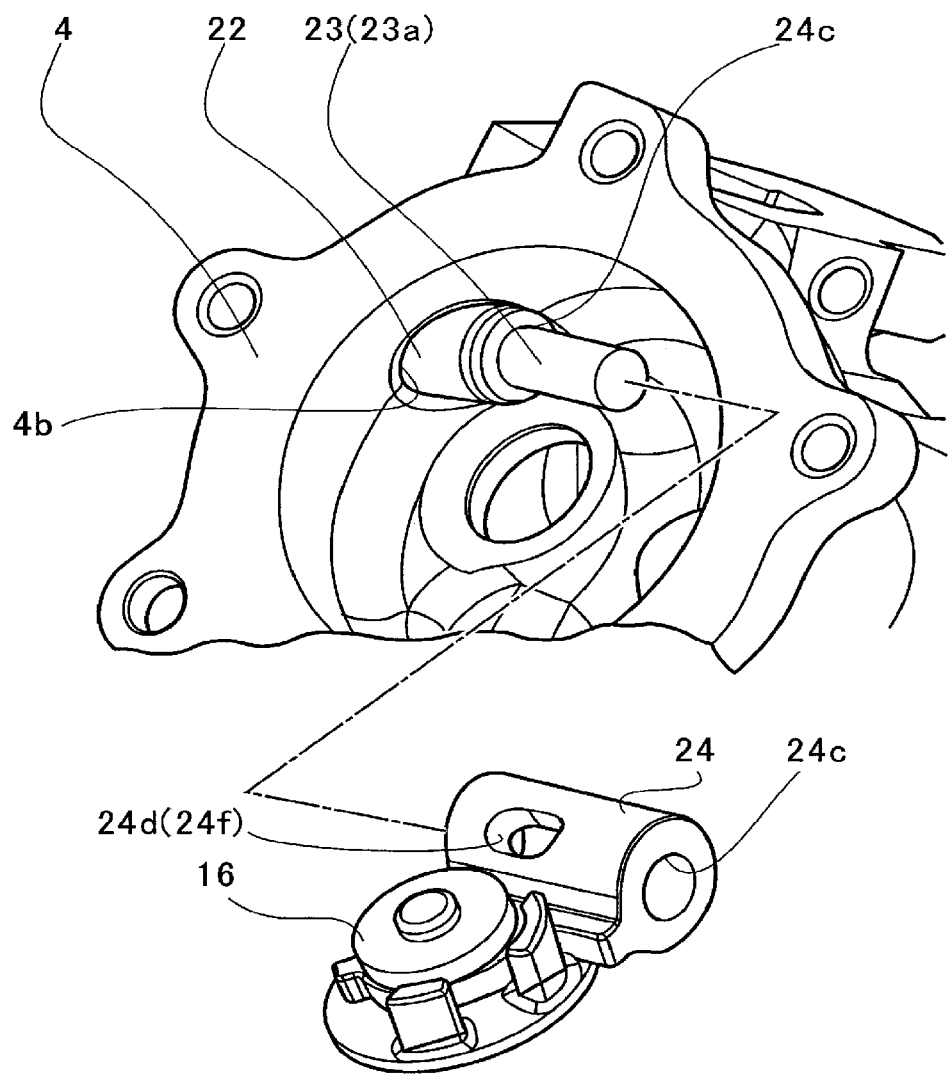
FIG. 6 is an explanatory view for illustrating the assembly of the valve and the attaching plate to a shaft.

FIG. 6 is a view for illustrating the assembly of the valve 16 and the attaching plate 24 to the shaft 23. As shown in FIG. 6, the bearing portion 22 is press-fitted into the housing hole 4b of the turbine housing 4, and thereafter the shaft 23 is inserted into the bearing portion 22. Furthermore, the valve 16 is swaged and coupled to the attaching plate 24, and then the attaching plate 24 is fixed to the side of one end of the shaft 23 protruding from the bearing portion 22.

Thereafter, the shaft 23 is inserted into the insertion hole 24c, and the outer circumferential surface 23a of the shaft 23 is exposed from the exposure hole 24d. The circumferential surface 23a exposed to the exposure hole 24d and the inner wall 24f of the exposure hole 24d are welded, and thus the shaft 23 is fixed to the attaching plate 24.

Figure 7:
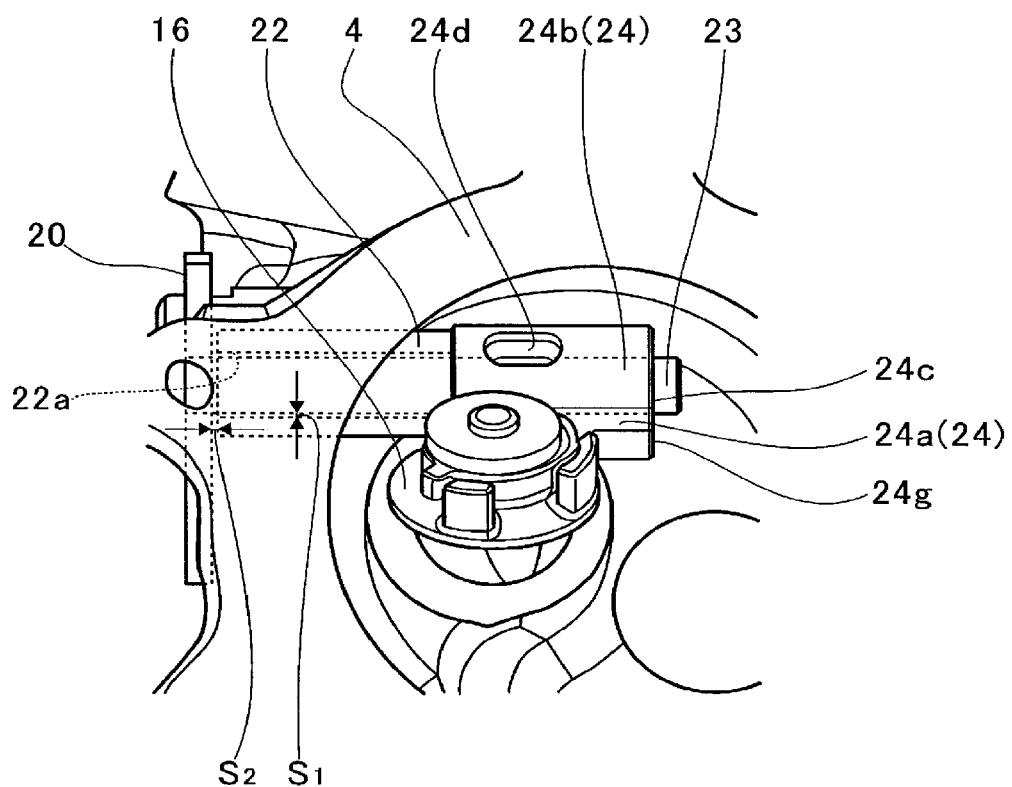
FIG. 7 is a perspective view of a turbine housing to which the shaft, the valve and the attaching plate are assembled.

FIG. 7 is a perspective view of the turbine housing 4 to which the shaft 23, the valve 16 and the attaching plate 24 are assembled. As shown in FIG. 7, in order to prevent the rotational movement of the shaft 23 from being inhibited, a gap $S_1$ (backlash) of the shaft 23 in the radial direction is formed between the shaft 23 and the bearing hole 22a of the bearing portion 22, and a gap $S_2$ (backlash) of the shaft 23 in the radial direction is formed between the link plate 20 and the bearing portion 22. Accordingly, the shaft 23 may be vibrated in the axial direction or in the radial direction to thereby produce a noise, due to the influence of exhaust pulsation or the like. Therefore, the attaching plate 24 of the present embodiment has a structure for suppressing such vibration.

As described above, the base portion 24b of the attaching plate 24 is larger substantially toward the right side than in the comparative example in FIG. 3B. As a result, as shown in FIG. 7, in a state where the base portion 24b is assembled to the shaft 23, the base portion 24b protrudes more in the radial direction of the shaft 23 than the bearing portion 22 over a part range on the side closer to the exposure hole 24d than the shaft 23 in the circumferential direction (the circumferential direction of the shaft 23) of the base portion 24b.

Here, in a range on the opposite side (in FIG. 3B, the left side) of the exposure hole 24d in the circumferential direction of the base portion 24b, the increase in the size in the radial direction does not need to be performed so that interference with the turbine housing 4 is avoided.

Furthermore, the base portion 24b and the extension portion 24a extend longer in the direction (the axial direction of the shaft 23 shown in FIG. 7) indicated by the double-headed arrow in FIG. 3A than in the comparative example. As a result, as shown in FIG. 7, in the base portion 24b and the extension portion 24a, an end portion 24g on the side opposite to the side of the bearing portion 22 protrudes more in the axial direction (in FIG. 7, the right side) of the shaft 23 than the valve 16.

As described above, the total weight of the member rotating together with the shaft 23 is increased by the increase in the size of the attaching plate 24. In this way, it is possible to suppress the vibration of the shaft 23 and the like that operate the valve 16 and an abnormal noise caused by the vibration.

Moreover, since the wall surface (inner wall) of the turbine housing 4 is arranged relatively away from the valve 16 in order to avoid interference with the valve 16, the gap in the radial direction of the base portion 24b when seen from the base portion 24b is easily increased. Accordingly, even when the size of the base portion 24b in the radial direction is increased, it becomes easy to avoid interference with other members.

In addition, the base portion 24b and the extension portion 24a protrudes more to the right side in FIG. 7 in the axial direction of the shaft 23 than the valve 16, and thus it is possible to increase the weight without changing the deviation of the weight in the rotation direction of the shaft 23.

In addition, one end of the shaft 23 on the side of the attaching plate 24 protrudes from the insertion hole 24c of the attaching plate 24. Therefore, the weight of the shaft 23 is increased, and thus the vibration suppression effect is further exerted.

In the embodiment discussed above, the description has been given of the case where the base portion 24b protrudes more in the radial direction of the shaft 23 than the bearing portion 22 over a part range on the side closer to the exposure hole 24d than the shaft 23 in the circumferential direction, and where parts of the base portion 24b and the extension portion 24a protrude more to the right side in FIG. 7 in the axial direction of the shaft 23 than the valve 16. However, preferably, at least, the base portion 24b protrudes more in the radial direction of the shaft 23 than the bearing portion 22 over a part range on the side closer to the exposure hole 24d than the shaft 23 in the circumferential direction of the base portion, or any one of the base portion 24b and the extension portion 24a protrudes more to the right side in FIG. 7 in the axial direction of the shaft 23 than the valve 16.

Furthermore, in the embodiment discussed above, the description has also been given of the case where in the base portion 24b and the extension portion 24a, the end portion 24g on the side opposite to the side of the bearing portion 22 protrudes more to the right side in FIG. 7 in the axial direction of the shaft 23 than the valve 16. However, in the base portion 24b and the extension portion 24a, the end portion on the side of the bearing portion 22 may protrude more to the left side in FIG. 7 in the axial direction of the shaft 23 than the valve 16. However, since it is highly likely that in the base portion 24b and the extension portion 24a, the end portion on the side of the bearing portion 22 has a small gap of the turbine housing 4 and that the side of the end portion 24g has a large gap of the turbine housing 4, when the end portion 24g protrudes to the right side in FIG. 7 to thereby have a larger size, the flexibility of the change of the shape is enhanced.

Moreover, although in the embodiment described above, the description has also been given of the attaching plate 24 for operating the valve 16 which opens and closes the exit end 18a of the bypass flow path 18, an attaching plate for operating another valve may be applied.

Specifically, for example, an attaching plate for opening and closing a bypass flow path that bypasses an intake flow path provided in the compressor housing 6 may be applied.

Additionally, when a turbocharger is a twin scroll-type turbocharger, an attaching plate for adjusting the flow rate of exhaust gas flowing into one turbine scroll flow path and the flow rate of exhaust gas flowing into the other turbine scroll flow path may be applied.

Furthermore, in a case of one turbocharger constituting a series-type multi-stage turbocharger in which a low-pressure stage turbocharger and a high-pressure stage turbocharger are connected in series to the exhaust manifold of the engine, or a parallel-type multi-stage turbocharger in which a plurality of turbochargers is connected in parallel to the exhaust manifold of the engine, a link plate for adjusting the flow rate of exhaust gas flowing into the turbine housing of the turbocharger may be applied.

Moreover, a portion in which the size of the attaching plate 24 is increased is not limited to the radial direction and the axial direction of the base portion 24b as in the embodiment described above, and any other portion of the attaching plate 24 may be applied.

Although the embodiment of the present disclosure has been described above with reference to the accompanying drawings, it is needless to say that the present disclosure is not limited to such an embodiment. It is clear that a person skilled in the art would be able to conceive various variations and modifications in the scope of claims, and it is understood that they are naturally included in the technical scope of the present disclosure.

What is claimed is:

1. A turbocharger comprising:
a compressor;
a turbine drivingly connected with the compressor via a rotation axis;
a housing rotatably accommodating a wheel of the compressor or turbine, the housing including an internal space for a gas flow formed therein;
a cylindrical bearing portion provided in the housing, the cylindrical bearing portion being provided with a bearing hole penetrating between the internal space of the housing and an outside of the housing;
a shaft rotatably supported in the bearing hole, including one end protruding more to an inside of the housing than the bearing portion and terminated in the internal space of the housing;
an attaching member included in the internal space of the housing and fixed to the shaft; and
a valve coupled to the shaft via the attaching member, the valve being configured to open and close a flow path opened to the internal space when the shaft is rotated,
wherein the attaching member includes:
a base portion including an insertion hole through which the shaft is inserted; and
an extension portion which is formed integrally with the base portion and which extends from the base portion in a radial direction of the shaft to thereby hold the valve, and
one part of the base portion in a circumferential direction of the shaft protrudes more in the radial direction of the shaft than the bearing portion and an other part of the base portion in the circumferential direction of the shaft.

2. The turbocharger according to claim 1,
wherein any one or both of the base portion and the extension portion protrude more than the valve in a direction from the bearing portion toward the attaching member along an axis of the shaft.

3. The turbocharger according to claim 2,
wherein any one or both of the base portion and the extension portion protrudes more than the valve in a direction from the attaching member toward the bearing portion along the axis of the shaft.

4. The turbocharger according to claim 1,
wherein one end of the shaft protrudes from the insertion hole.

5. The turbocharger according to claim 2,
wherein one end of the shaft protrudes from the insertion hole.

6. The turbocharger according to claim 3,
wherein one end of the shaft protrudes from the insertion hole.

7. A turbocharger comprising:
a compressor;
a turbine drivingly connected with the compressor via a rotation axis;
a housing rotatably accommodating a wheel of the compressor or turbine, the housing including an internal space for a gas flow is formed therein;
a cylindrical bearing portion provided in the housing, the cylindrical bearing portion being provided with a bearing hole penetrating between the internal space of the housing and an outside of the housing;
a shaft rotatably supported in the bearing hole, including one end protruding more to an inside of the housing than the bearing portion an terminated in the internal space of the housing;
an attaching member included in the internal space of the housing and fixed to the shaft; and
a valve coupled to the shaft via the attaching member, the valve being configured to open and close a flow path opened to the internal space when the shaft is rotated,
wherein the attaching member includes:
a base portion including an insertion hole through which the shaft is inserted; and
an extension portion which is integrally formed with the base portion and which extends from the base portion in a radial direction of the shaft to thereby hold the valve, and
any one or both of the base portion and the extension portion protrude more than the valve in a direction from the bearing portion toward the attaching member along an axis of the shaft.

8. The turbocharger according to claim 7,
wherein any one or both of the base portion and the extension portion protrudes more than the valve in a direction from the attaching member toward the bearing portion along the axis of the shaft.

9. The turbocharger according to claim 7,
wherein one end of the shaft protrudes from the insertion hole.

10. The turbocharger according to claim 8,
wherein one end of the shaft protrudes from the insertion hole.

* * * * *